United States Patent [19]

Calevro et al.

[11] 4,077,792
[45] Mar. 7, 1978

[54] ADJUSTABLE RACK FOR SUPPORTING A GLASS SHEET

[75] Inventors: Torino E. Calevro, Perrysburg; Floyd T. Hagedorn, Oregon, both of Ohio

[73] Assignee: Libbey-Owens-Ford Company, Toledo, Ohio

[21] Appl. No.: 752,019

[22] Filed: Dec. 20, 1976

[51] Int. Cl.² .................................. C03B 29/04
[52] U.S. Cl. .......................... 65/288; 65/273
[58] Field of Search ............ 65/107, 111, 118, 119, 65/273, 288, 287

[56] References Cited

U.S. PATENT DOCUMENTS

| 2,297,315 | 9/1942 | Owen | 65/287 |
| 2,608,030 | 8/1952 | Jendrisak | 65/287 |
| 3,206,294 | 9/1965 | Shaffer et al. | 65/107 X |
| 3,278,289 | 10/1966 | Humes | 65/107 X |
| 3,484,226 | 12/1969 | Golightly | 65/107 X |
| 3,837,833 | 9/1974 | Couture et al. | 65/287 X |
| 4,002,450 | 1/1977 | Hamilton et al. | 65/107 |

Primary Examiner—Arthur D. Kellogg
Attorney, Agent, or Firm—Collins, Oberlin & Darr

[57] ABSTRACT

An adjustable rack for accommodating differently sized glazing units. Support elements are mounted on the rack and are formed to provide anti-friction, minimal heat conducting bearing surfaces for supporting heated glazing units thereon to facilitate slight relative movement therebetween to avoid optical defects and without adverse thermal influence on the glazing units.

14 Claims, 5 Drawing Figures

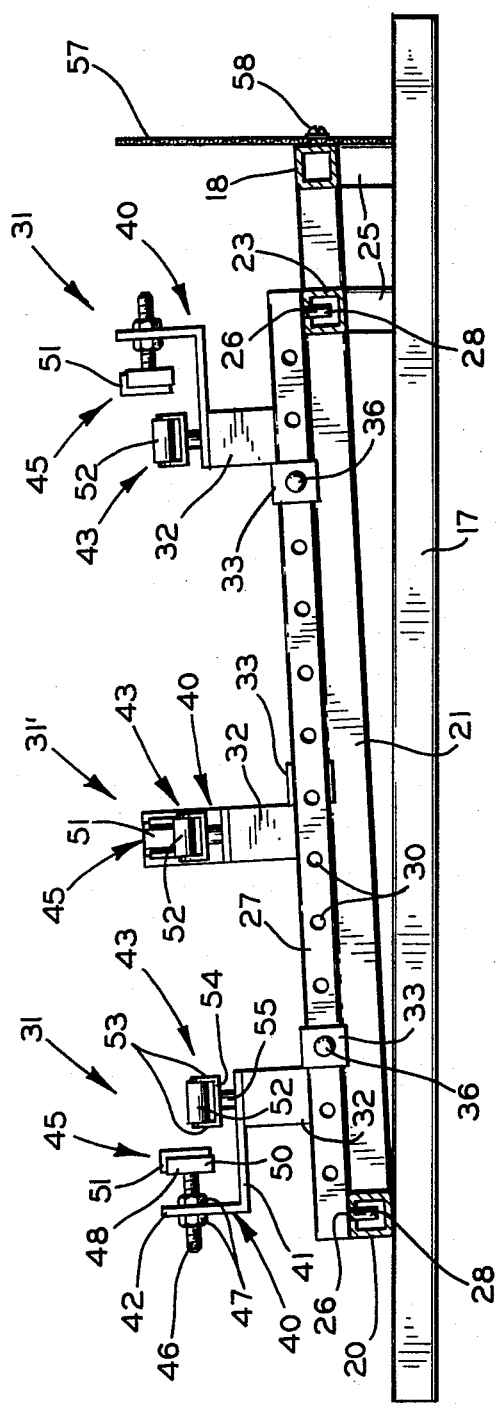
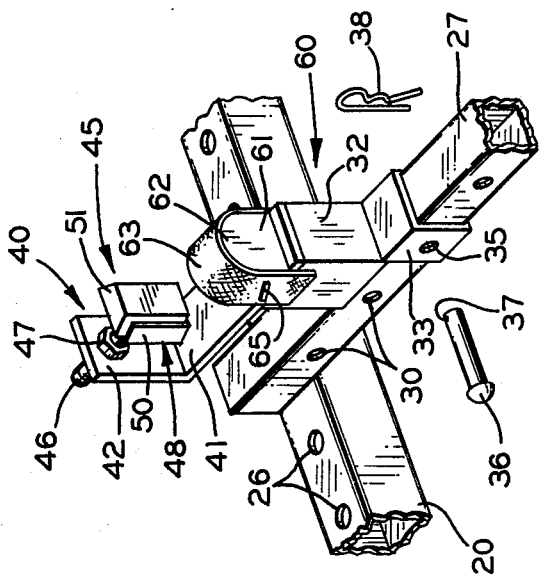
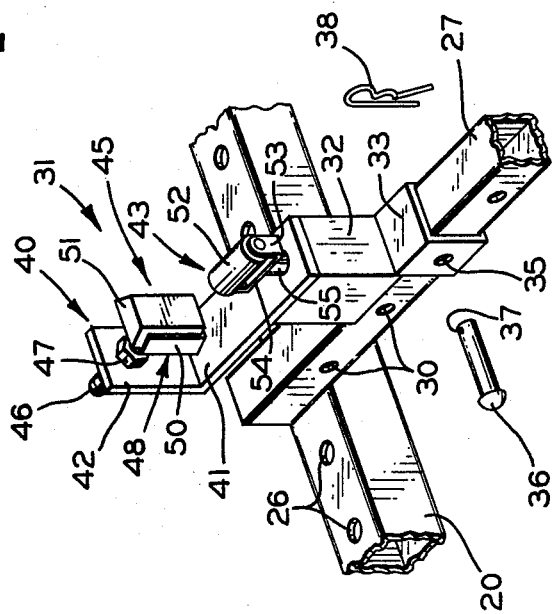

ADJUSTABLE RACK FOR SUPPORTING A GLASS SHEET

BACKGROUND OF THE INVENTION

The present invention relates generally to the conveyance of sheet materials and, more particularly, to an adjustable rack for supporting a glazing sheet in a generally horizontal position.

The use of racks or product supporting carriers are widely used within glass fabrication facilities for the transport of glass sheets, such as are intended for use as glazing closures in vehicles and the like, for example. Very often, these sheets must be heated to elevated temperatures and one expedient process for accomplishing this is to support individual sheets on racks and advance them through a heating furnace. One problem encountered in the conveyance of heat-softened glass sheets supported on conventional racks is the marring or scratching of the glass surfaces caused by the relative movement between such glass surfaces and the supporting surfaces of the rack, especially when direction of movement of the advancing glass-laden racks is changed or when they are transferred between right angularly related conveyor sections. This causes the heat-softened sheet to shift on the rack, tending to mark or scratch the glass surface along the regions of contact with the supporting surface of the rack, such defective surfaces often failing to meet the stringent optical requirements necessary in automotive glazing closures.

Another problem encounted in the heating of glass sheets carried on conventional racks is the adverse influence of the latter in altering the temperature profile of the sheets. For example, the relatively large, heat conducting, glass contacting surfaces of these known racks tend to conduct heat away from the glass surfaces to form cold spots and impose severe stresses therein, rendering the glass vulnerable to venting and breakage. Additionally, the metallic framework of racks absorbs heat and, with the glass sheet disposed in close proximity to such framework as in conventional racks, absorbs some of the heat otherwise intended for those glass portions adjacent the framework during heating while retarding the rate of cooling of such adjacent glass portions wheen subsequently removed from the heating atmosphere or furnace. These temperature differentials induced in the glass also impose undesirable stresses in the sheets to further increase the possibilities of venting and breakage. Moreover, conventional glass carrying racks do not offer protection for the glass sheets against the thermal currents inherently present in furnaces and which also produce thermal variations within a glass sheet passing through these furnaces.

Furthermore, since it is possible to process on the same production line a variety of differently sized glass sheets, it would be desirable to provide an adjustable rack for accommbdating a variety of glass sizes rather than utilizing a supply of differently sized racks requiring large storage areas and sometimes special handling equipment.

SUMMARY OF THE INVENTION

Accordingly, it is an object of the present invention to obviate the above shortcomings by providing a new and improved adjustable transport rack, especially adapted to accommodate glass sheets exposed to elevated temperatures without adversely affecting the uniform distribution of heat imparted thereto.

It is another object of this invention to provide the foregoing rack with anti-friction glass supporting surfaces to facilitate relative movement between such surfaces and the glass sheet to prevent marring and distortion of the heat-softened glass sheet carried thereon.

It is still another object of the present invention to provide such rack with minimal heat conducting support surfaces to avoid severe temperature variations within the glass sheet.

It is a further object of this invention to provide the foregoing rack with means controlling the influence of ambient thermal conditions on the glass carried thereby through a heating atmosphere.

In one aspect thereof, the adjustable glass supporting rack of this invention is characterized by a frame including cross members removably secured at selectively spaced intervals along the frame. Detachable support blocks are adjustably mounted on the cross members at selectively spaced distances from each other to accommodate a wide variety of glass sheet sizes. The support blocks include locator stops, respectively, for properly locating the sheet on the rack with limited movement in one direction only. Also, the support blocks include minimal heat conducting, glass supporting surfaces formed to provide anti-friction bearing surfaces for the glass sheet to readily accommodate slight relative movement therebetween without attendant marking or scratching.

The foregoing and other objects, advantages, and characterizing features of the present invention will become clearly apparent from the ensuing detailed description illustrative embodiments thereof, taken together with the accompanying drawings wherein like reference characters denote like parts throughout the various views.

BRIEF DESCRIPTION OF THE DRAWINGS

FIG. 3 is a cross sectional view, on an enlarged scale, taken along the line 3—3 of FIG. 2;

FIG. 4 is a fragmentary, perspective view, showing details of one form of a glass supporting block of the rack of FIG. 2; and FIG. 5 is a fragmentary, perspective view, showing another form of support block employed in the rack of this invention.

DESCRIPTION OF THE PREFERRED EMBODIMENT

Figure 1:
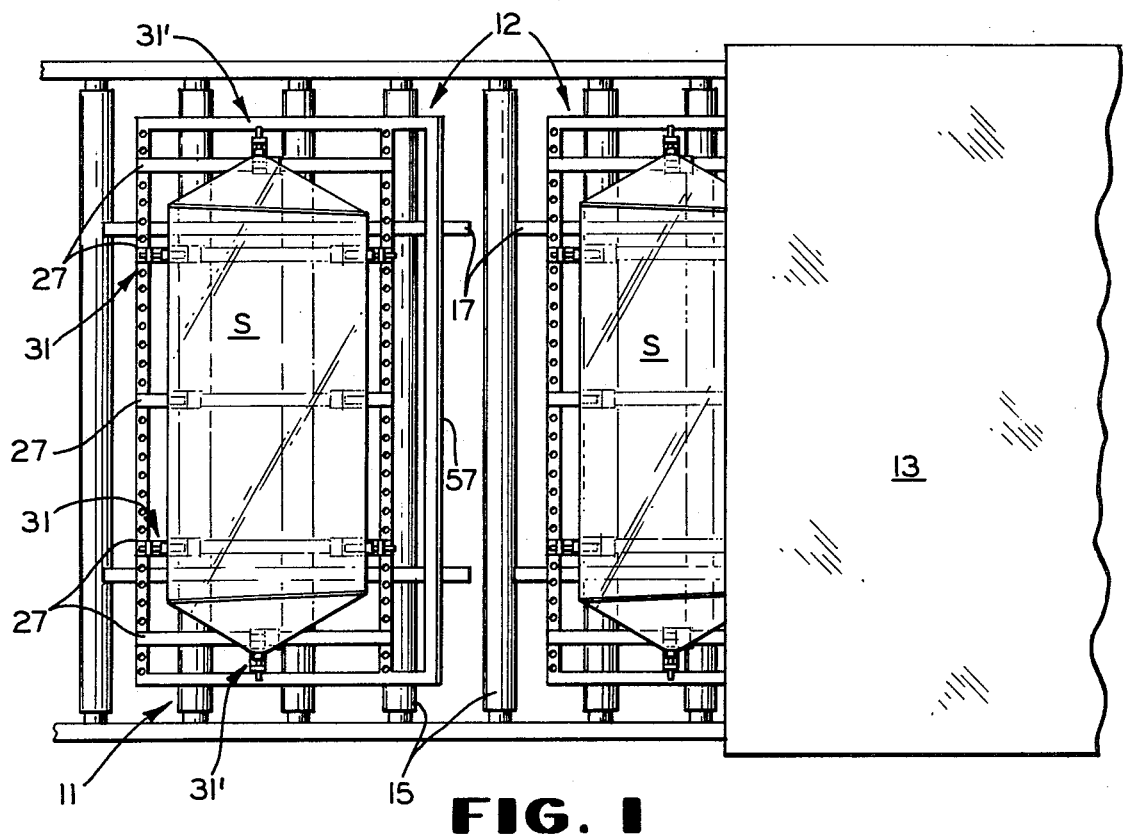
FIG. 1 is a top plan view of a glass processing operation showing a plurality of glass laden racks, constructed in accordance with this invention, being advanced on a conveyor toward and into a heating furnace.

While the adjustable transport rack of this invention has utility in the support and conveyance of glazing units or sheet material generally, it is especially adapted for use in connection with a glass heating operation, such as that illustratively depicted in FIG. 1 of the drawings, and which is employed as a preliminary step in the formation of bent glazing closures intended for use in vehicles and the like. In this illustrative continuous operation, the glass sheets have imprinted on at least their one surfaces an electrically conductive paste composition which must be fired or fused onto such surfaces. To this end, the glass sheets, provided with electrically conductive material thereon, are advanced singularly in succession through a heating furnace to heat the sheets to the required elevated temperature necessary to permanently affix or fuse the electrically conducting material onto the glass surfaces.

Referring now in detail to the illustrative embodiment depicted in the accompanying drawings for carrying out this invention, there is shown in FIG. 1 a glass sheet processing production line, comprehensively designated 10, which includes a continuous horizontal conveyor system 11 adapted to support and advance a series of glass laden racks, generally designated 12, in a continuous, substantially horizontal path through a heating furnace 13 for the purpose of heating sheets S individually carried by the racks 12 to an elevated temperature for firing or fusing the electrically conductive material thereon. While the path of travel is in a substantially horizontal plane, it can make a generally U-shaped turn formed, for example, by an arrangement of right angularly related conveyor sections so that upon leaving furnace 13, the sheets are returned on the conveyor system 11 in a horizontal path in spaced parallel relation to the horizontal path admitting the glass laden racks 12 into furnace 13.

The heating furnace 13 can be of tthe tunnel-type formed of suitable top, bottom and side walls to define a heating chamber brought up to the desired temperature level by any suitable heating means, such as gas fired burners or electrical resistance elements for example. Since the furnace 13 and the heating means incorporated therein are conventional, no further detailed description or amplification thereof is believed necessary. The glass carrying racks 12 are advanced through the furnace on a plurality of conveyor rolls 15, forming a part of the conveyor system 11, and extending transversely across furnace 13 with their respective opposite ends being suitably journalled for rotation and driven by conventional power means, well known in the art.

Figure 2:
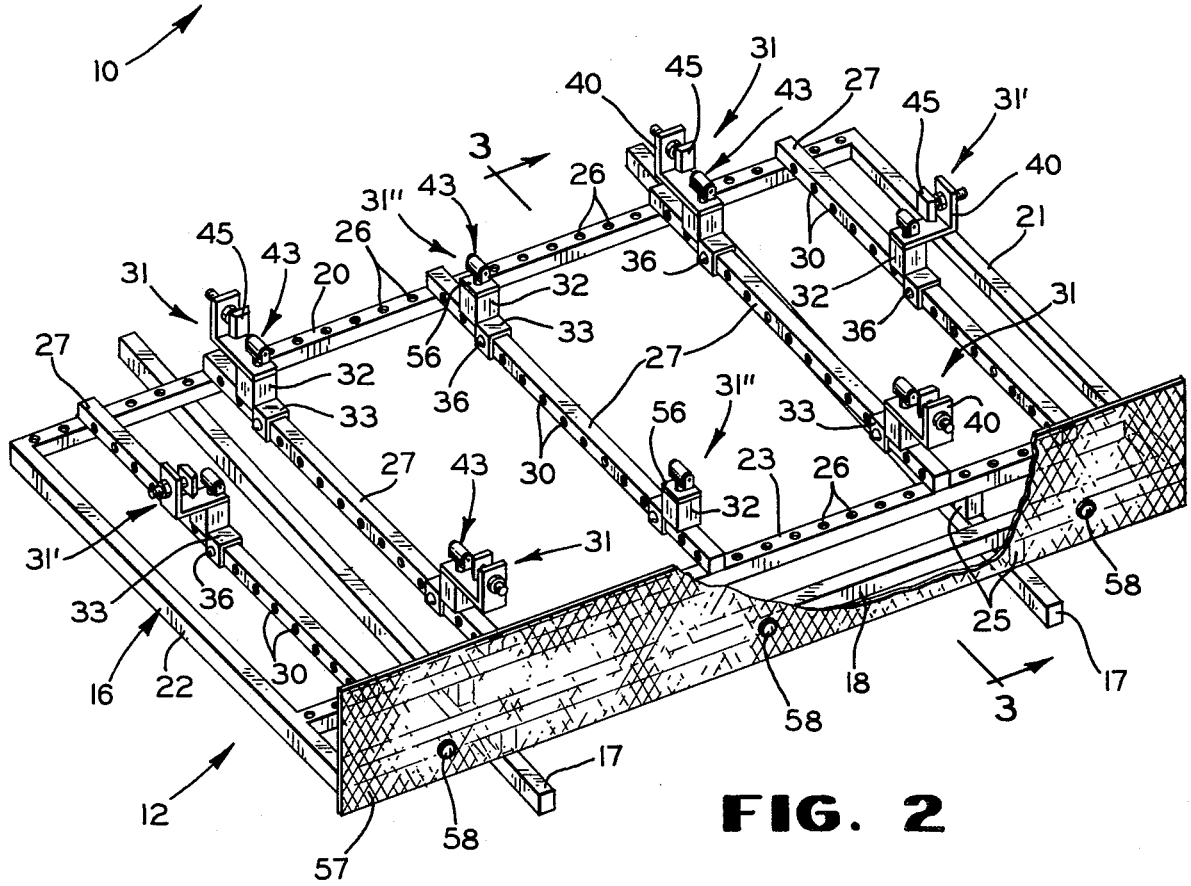
FIG. 2 is a perspective view of a transport rack embodying the novel features of this invention.

As best shown in FIGS. 2 – 4, the rack 12, constructed in accordance with this invention, comprises an open frame 16, of generally rectangular configuration in plan, supported on and suitably secured to a pair of parallel, laterally spaced, elongated runners 17 of generally square or rectangular configuration in cross section and which support the rack 12 upon a conveying means, such as conveyor system 11, or any other suitable substructure. For purposes of this description, the right end of rack 12, as viewed in FIG. 3, will be taken as the front end of the rack 12 and generally will be the leading end thereof when advanced on the conveyor system 11.

The frame 16 includes laterally spaced, longitudinal front and rear rails 18 and 20, transversely extending side rails 21 and 22 extending between and connecting rails 18 and 20 together, and a longitudinal intermediate rail 23 inwardly of front rail 18 in spaced, parallel relation thereto and connected at its oppsite ends to side rails 21 and 22 tb form an integral, rigid construction. It should be understood that the front longitudinal rail 18, together with those portions of side rails 21 and 22 projecting past rail 23, form an extension of frame 16 for the purpose of mounting a heat shield thereon as will hereinafter be more fully described. However, this extension can be omitted, if desired, as long as the heat shield does not interfere with any of the other components mounted on rack 12.

As best shown in FIG. 3, the frame 16 is mounted in an inclined attitude on runners 17 for a purpose that will hereinafter be explained. To this end, the rear longitudinal rail 20 is affixed directly to one of the runners 17 while the forward or front end of frame 16 is elevated above the runners and affixed to support blocks 25 interposed between the frame 16 and runner 17.

The several rails forming frame 16 are formed of hollow metal tubing of generally square configuration in cross section. The longitudinal rear and intermediate rails 20 and 23 are formed with a plurality of longitudinally spaced openings 26 in the top walls thereof for a purpose that will presently become apparent.

A plurality of transversely extending cross members 27 of square, metal tubing, are mounted on rails 20 and 23 in selective spaced relation therealong. To this end, each cross member 27 is provided with pins 28 (FIG. 3) projecting downwardly from the bottom wall thereof adjacent the opposite ends of the member 27 for insertion in the laterally aligned openings 26 of rails 20 and 23. Rather than form the pins 28 as integral parts of cross member 27, the latter can be provided with openings in the top and bottom walls thereof adapted to be aligned with openings 26 for the insertion of removable pins (not shown) to retain these cross members 27 in their selective positions on rails 20 and 23. In either event, the spacing between adjacent cross members 27, and the overall length between the end-most cross members 27, can be varied as required to accommodate glass sheets of various sizes and configurations. The cross members 27 also are formed with aligned openings 30 in the two opposite side walls thereof for facilitating the mounting of support blocks thereon as will presently be described.

The means for supporting the glass sheets on rack 12 includes support blocks, generally designated 31 (FIG. 4), each comprising a hollow block 32 having a square shaped collar 33 rigidly secured to one face thereof adjacent the lower end of block 32. Collar 33 is telescopically received on cross member 27 for sliding movement axially thereon and is provided with aligned openings 35 in the two opposite side walls thereof. Thus, each support block 31 can be adjustably positioned on cross member 27 at any selected position therealong and retained in place by aligning the openings 35 of collar 33 with any two laterally aligned openings 30 in cross member 27 and inserting a pin 36 into the aligned openings. As shown in FIG. 4, the pin 36 is provided with a diametrical bore 37 at its distal end for receiving a cotton pin 38 to retain pin 36 in place.

Each support block 31 includes an L-shaped bracket 40 having a generally horizontal leg 41 and an upright leg 42. A glass supporting element, generally designated 43, is mounted on the horizontal leg 41 of bracket 40 and a locator stop, generally designated 45, is mounted on the upright leg 42. Each stop 45 comprises an elongated rod 46 projecting through the bracket of upright leg 42 and adjustably secured thereto by means of lock nuts 47 threaded onto rod 46 and bearing against opposite sides of upright leg 42. A holder 48 is secured to the inner end of rod 46 and is provided with a bottom wall and converging side walls 50 for receiving a complementary-shaped block 51 formed of any suitable heat-resistant, refractory material which is engageable with the edge of the glass sheet.

In the preferred form shown in FIGS. 3 and 4, the glass engaging element comprises a freely rotating, cylindrical shaped roller 52 providing an anti-friction bearing surface for the glass sheet. Roller 52 is mounted on a suitable shaft for free rotation thereon, the ends of the shaft being suitably mounted in the upstanding ends 53 of a yolk member 54 carried by an upright post 55 rigidly secured to the horizontal leg of bracket 40. The roller 52 is located inwardly of the locator block 51 with the axis of rotation extending in a direction generally parallel to its associated cross member 27, thereby permitting movement of the glass sheet supported thereon in a direction normal to the axis of roller rotation.

While rollers 52 can be formed of various anti-friction materials or compositions, preferably rollers 52 are formed of carbon, and particularly PO3-XHT carbon, to facilitate slight movement of the glass sheet thereon. It has been found that rollers formed of carbon are durable, can withstand the elevated temperatures subjected to in the furnace, and do not scratch or mark the supporting glass sheet while offering a self-lubricating, substantially frictionless bearing surface therefor upon rolling contact therewith. Moreover, the rollers 52 offer only line contact with the glass sheet to minimize heat transmission away from the glass surface and thereby preclude the formation of cold spots on each surfaces and possible glass breakage resulting therefrom.

The specific construction of the several support blocks 31 can vary somewhat as dictated by their particular location and function on the rack 12. As shown in the illustrative embodiment of FIG. 2, for example, the end support blocks, identified as 31', and which are carried on the outermost opposite cross members 27, differ from support blocks 31 by having their roller axes oriented substantially parallel to the glass contacting faces of locator blocks 51 rather than normal thereto. The support blocks, identified as 31", which are carried on the central cross member 27, differ from support blocks 31 by the absence of locator stops 45. To this end, the support blocks 31" are provided with plates 56 of generally square shaped configuration in plan rather than L-shaped brackets for mounting the rollers 32 thereon. In any event, the axes of all the rollers 32 of the several support blocks 31, 31' and 31" are oriented in the same direction to facilitate limited sliding movement of the glass sheet supported thereon in a direction normal to the direction of roller axes orientation. While only one cross member 27 is shown provided with modified support blocks 31", it should be appreciated that two or more cross members carrying such blocks 31" can be utilized, if desired.

When utilizing racks to convey glass sheets through a heating chamber, the metallic framework of the rack absorbs heat. This poses problems with conventional racks due to the close proximity of portions of the glass sheet to such heated framework whereby the latter absorbs some of the heat otherwise intended for these glass portions. This creates cold spots in the glass i. e. extreme temperature differentials within the glass sheet rendering it susceptible to venting the possible breakage. Likewise, after leaving the furnace, the heat absorbed and retained by the framework retards the cooling rate of those glass portions disposed adjacent thereto to again generate extreme, undesirable temperature variations within the glass.

The rack construction of this invention obviates this problem by supporting the glass sheets on the rollers 52 well above the metallic rails 18 - 23 and members 27 of the frame 16 to minimize temperature variations within the glass sheet otherwise resulting from heat absorption and retention in such metallic parts. The glass shset is spaced away from the heated rack frame sufficiently so that its heating and cooling rates are not impeded or adversely affected in anyway by the heat absorbed and then slowly dissipated from the frame.

Also, it is important to protect the glass sheets being conveyed through the furnace against certain ambient conditions inherent therein, such as thermal currents and the like, for example. To this end, an elongated heat shield 57 is mounted on the forward or leading end of rack 12 to retard heating of the glass sheet adjacent such end. The heat shield 57 is formed of a wire mesh screen and is mounted in an upright position against the front rail 18 of frame 16 and rigidly secured thereto, as by means of fasteners 58 for example. While preferably the heat shield 57 is shown as an elongated, continuous member extending across the entirety of the rack 12 at the leading end thereof, it should be understood that it can be positioned along the rear or trailing end of the rack and formed of relatively short sections arranged in axially spaced relation along the frame rails 18 or 20. Generally, the racks are advanced in an abutting relation through the furnace so that the shields of adjacent racks, whether mounted on the leading or trailing ends of the racks, define a moving compartment or zone approximately the length of a rack and which provides a barrier against thermal drafts and the like. Of course, heat shields 57 of different lengths and widths can be selectively positioned anywhere on rack 12 in either a vertical or horizontal disposition, as desired or required.

Prior to utilizing a particular rack, support blocks 31, 31' and 31" are selectively positioned on their associated cross members 27 as dictated by the size of the specific sheet to be carried thereby and preferably are positioned to space each pair of opposed locator stops 45 a distance slightly greater than the dimension of that portion of the sheet extending between such stops 45 and the marginal edges of the sheet. This clearance is important in a commercial, high volume production line operation to facilitate fast and convenient loading of glass sheets on the rack 12.

However, due to this clearance, there will be slight movement or shifting, but in one direction only, of the sheet on the rack during its transport on the conveyor system, especially in those instances where the rack 12 is guided in a sharp turn or is transferred from one conveyor section to another right angularly related conveyor section. Movement or shifting of the glass sheet relative to the rack in a direction parallel to the axis of support rollers 52 is precluded by virtue of the inclined orientation of the sheet resting at its lower end against those stops 45 mounted at the lower end of the rack. Thus, the sheet is maintained against the lower set of locator stops 45 under the influence of gravity to virtually eliminate any slight movement of the sheet on the rollers 52 in a direction parallel thereto. Movement of the sheet in a direction normal to the roller axes is permitted and is facilitated by the anti-friction bearing contact of rollers 52 with the glass sheet.

FIG. 5 illustrates another form of glass support block of this invention, generally designated 60, which is very similar to support block 31 except for a modified form of glass supporting element. The other structural features of support block 31 and their intended functions are duplicated in this second form of the invention, and the same reference characters are used to identify similar elements. The glass supporting element comprises a block 61 rigidly affixed to the horizontal leg 41 of bracket 40 and is formed of a suitable heat insulating material, preferably of the type marketed under the tradename Marinite. The upper end of block 61 is provided with an arcuately shaped crown 62, the tip of which forms an anti-friction glass supporting or bearing surface for the heated glass sheet and offers only line contact therewith to minimize the formation of cold spots on the glass and avoid possible venting or breakage resulting therefrom. While not limited thereto, the crown 62 can be covered with a heat resistant cloth 63, formed of asbestos or fibre glass for example, affixed thereto as by means of a fastener 65.

In a mass production glass processing operation, glass sheets S are loaded singly onto the racks 12 with each sheet being supported in an inclined attitude on frame 16 and the lower marginal edge thereof resting against the lower or rear set of locator stops 45. As hereinbefore mentioned, the elevated or right end of the rack as viewed in FIG. 3, is the leading end of the rack when moved along the conveyor system 11. However, the opposite or lower end could be the leading end, if desired. In either event, the influence of gravity on the sheet will maintain it against the lower set of stops 45 and virtually eliminate any movement of the sheet toward the opposite set of stops 45 located at the upper end of the rack, notwithstanding the clearance therebetween.

The racks 12 tend to accumulate in an end-to-end abutting relation as they advance through furnace 13 and the spaced heat shields 57 of adjacent racks 12 define compartmental zones shielding the sheets from ambient drafts, thermal currents and the like. Moreover, the shields 57 prevent excessive heating of the leading edges of the sheets, assuring more uniform heating throughout. As the glass laden racks 12 leave furnace 13, they are either guided on the conveyor system 11 into a U-shaped turn for return in a direction opposite but parallel to the horizontal path through furnace 13 or transferred onto right angularly related conveyor sections to effect the same U-turn pattern. In any event, the glass sheets S will shift or slide laterally on their respective racks 12 during such direction changes. However, the anti-friction rollers 43 readily permit such lateral movement without scratching or marring the glass surface in contact therewith.

Also, because of the elevated spacing of the glass supporting rollers 52 away from the metallic framework of the rack 12 , there is no interference with the heat being applied to the sheet as it advances through the furnace. Likewise, the residual heat remaining in such framework upon exiting the furnace does not retard or impede the cooling rate of any portion of the glass sheet, as otherwise would occur if the sheet were disposed in close proximity to the metal structural members of the frame. Thus, the sheet is permitted to be heated and cooled uniformly. Moreover, the line contact bearing surfaces offered by the rollers minimizes heat transmission away from portions of the glass sheet to avoid cold spots therein and the undesirable internal stresses resulting therefrom.

It is to be understood that the forms of the invention herein shown and described are to be taken as illustrative embodiments only, and that various changes in the shape, size and arrangement of parts, may be resorted to without departing from the spirit of the invention.

We claim:

1. A rack especially adapted for supporting a glass sheet intended to be heated to an elevated temperature comprising: a frame including a pair of longitudinally extending rails disposed in spaced parallel relation to each other and a pair of transversely extending rails connecting said longitudinal rails together, a plurality of cross members extending transversely of said frrame, means detachably securing the opposite ends of each cross member to said spaced longitudinal rails for selective positioning therealong, at least one support mounted on each of said cross members for selective positioning therealong, each support including a support element having an antifriction glass supporting surface for facilitating sliding movement of a glass sheet thereon, said support elements providing only line contact bearing surfaces at selectively spaced intervals for said glass sheet to minimize heat transmission away from the supported glass surface.

2. A rack according to claim 1, wherein certain of said supports include locator stops for positioning said sheet on said rack.

3. A rack according to claim 2, wherein each pair of opposed stops are spaced a distance slightly greater than the dimension of the glass sheet supported therebetween for limited movement of said sheet on said rack.

4. A rack according to claim 1, including a pair of spaced, elongated runners, and means mounting said frame on said runners in an inclined attitude thereon at a slight angle relative to the plane including said spaced runners.

5. A rack according to claim 1, wherein said detachable means include pins mounted on each of said cross members adjacent the opposite ends thereof and axially spaced openings in said longitudinal rails for receiving said pins.

6. A rack according to claim 1, wherein each of said supports is provided with an integral collar telescopically received on and slidable on said cross member for selective positioning therealong, and means detachably retaining said collar on said cross member in the selected position thereon.

7. A rack according to claim 1, wherein said support elements are rollers having their axes extending in the same direction generally parallel to said cross members.

8. A rack according to claim 7, wherein each of said rollers is formed of carbon.

9. A rack according to claim 1, wherein each of said support elements comprises a block having an arcuately shaped crown forming a line contact bearing surface for the sheet supported thereon.

10. A rack according to claim 9, wherein said crown is covered with a heat resistant cloth.

11. A rack according to claim 1, including a heat shield mounted on said frame for controlling heat input into said glass sheet.

12. A rack according to claim 11, wherein said shield is mounted on the leading end of said frame and substantially coextensive therewith, said shield extending vertically upwardly above said support elements and in longitudinal spaced relation therefrom.

13. A rack according to claim 1, wherein said glass supporting surfaces are spaced away from said longitudinally and transversely extending rails and said cross members to avoid the thermal influence of said rails and said members on said glass sheet.

14. A rack according to claim 13, wherein said glass supporting surfaces are disposed above said rails and said cross members in substantial spaced relation thereto.

* * * * *